(12) United States Patent        (10) Patent No.:     US 7,623,042 B2
Huizenga                          (45) Date of Patent:     Nov. 24, 2009

(54) WIRELESS NETWORK CONTROL FOR BUILDING LIGHTING SYSTEM

(75) Inventor: Charles A. Huizenga, Berkeley, CA (US)

(73) Assignee: Regents of the University of California, Oakland, CA (US)

( * ) Notice: Subject to any disclaimer, the term of this patent is extended or adjusted under 35 U.S.C. 154(b) by 317 days.

(21) Appl. No.: 11/376,620

(22) Filed: Mar. 14, 2006

(65) Prior Publication Data

US 2006/0215345 A1    Sep. 28, 2006

Related U.S. Application Data

(60) Provisional application No. 60/661,714, filed on Mar. 14, 2005.

(51) Int. Cl.
    *G08B 21/00* (2006.01)
(52) U.S. Cl. ........................ 340/641; 340/643
(58) Field of Classification Search ................ 340/641, 340/642, 643, 656, 815.6, 539.1, 539.11, 340/539.26, 506, 511; 315/291, 224, 307, 315/308, 194, 86, 51; 702/185
    See application file for complete search history.

(56) References Cited

U.S. PATENT DOCUMENTS

| | | | |
|---|---|---|---|
| 4,323,820 A * | 4/1982 | Teich | 315/86 |
| 4,355,309 A | 10/1982 | Hughey et al. | |
| 4,358,717 A * | 11/1982 | Elliott | 315/308 |
| 4,686,380 A | 8/1987 | Angott | |
| 4,797,599 A | 1/1989 | Ference et al. | |
| 5,005,211 A | 4/1991 | Yuhasz | |
| 5,146,153 A | 9/1992 | Luchaco et al. | |
| 5,237,264 A | 8/1993 | Moeley et al. | |
| 5,248,919 A | 9/1993 | Hanna et al. | |
| 5,373,453 A * | 12/1994 | Bae | 702/185 |
| 5,471,063 A | 11/1995 | Hayes et al. | |
| 5,561,351 A * | 10/1996 | Vrionis et al. | 315/248 |
| 5,637,930 A | 6/1997 | Rowen et al. | |
| 5,770,926 A | 6/1998 | Choi et al. | |
| 5,872,429 A * | 2/1999 | Xia et al. | 315/194 |
| 5,909,087 A | 6/1999 | Bryde et al. | |
| 5,982,103 A | 11/1999 | Mosebrook et al. | |
| 6,100,653 A * | 8/2000 | Lovell et al. | 315/307 |
| 6,169,377 B1 | 1/2001 | Bryde et al. | |
| 6,184,622 B1 * | 2/2001 | Lovell et al. | 315/41 |
| 6,249,516 B1 | 6/2001 | Brownrigg et al. | |
| 6,252,358 B1 | 6/2001 | Xydis et al. | |
| 6,297,724 B1 | 10/2001 | Bryans et al. | |
| 6,300,727 B1 | 10/2001 | Bryde et al. | |
| 6,400,280 B1 | 6/2002 | Osakabe | |
| 6,689,050 B1 * | 2/2004 | Beutter et al. | 600/117 |
| 6,803,728 B2 | 10/2004 | Balasubramaniam et al. | |
| 6,904,385 B1 | 6/2005 | Budike, Jr. | |
| 6,914,395 B2 | 7/2005 | Yamauchi et al. | |

(Continued)

*Primary Examiner*—Van T. Trieu
(74) *Attorney, Agent, or Firm*—Carr & Ferrell LLP (57) ABSTRACT

Wireless control of lighting fixtures via a wireless radio network using a radio-controlled relay device located between a lighting fixture or a ballast of a fluorescent fixture and its power supply. The radio-controlled device receives signals from remote controllers or via a computer interface. The wireless device is also configured to monitor the power consumption of a lighting fixture (or ballast) and send that information to the network. In the wireless control network, light level sensors and motion sensors also send information to the network to allow lights to respond to daylight levels or occupancy.

28 Claims, 5 Drawing Sheets

U.S. PATENT DOCUMENTS

| | | |
|---|---|---|
| 6,927,546 B2 | 8/2005 | Adamson et al. |
| 6,990,394 B2 | 1/2006 | Pasternak |
| 7,042,170 B2 * | 5/2006 | Vakil et al. .................. 315/291 |
| 7,045,968 B1 * | 5/2006 | Bierman et al. ............. 315/244 |
| 7,079,808 B2 * | 7/2006 | Striemer ........................ 455/7 |
| 7,103,511 B2 | 9/2006 | Petite |
| 7,167,777 B2 | 1/2007 | Budike, Jr. |
| 7,199,530 B2 * | 4/2007 | Vakil et al. .................. 315/291 |
| 7,307,389 B2 * | 12/2007 | Vakil et al. .................. 315/291 |
| 7,307,542 B1 | 12/2007 | Chandler et al. |
| 7,369,060 B2 * | 5/2008 | Veskovic et al. ....... 340/825.36 |
| 7,400,226 B2 * | 7/2008 | Barrieau et al. ........ 340/286.01 |
| 7,490,957 B2 * | 2/2009 | Leong et al. .................. 315/51 |
| 2004/0051467 A1 | 3/2004 | Balasubramaniam et al. |

* cited by examiner

WIRELESS NETWORK CONTROL FOR BUILDING LIGHTING SYSTEM

CROSS-REFERENCES TO RELATED APPLICATIONS

This application claims priority to U.S. Provisional Patent Application No. 60/661,714, filed Mar. 14, 2005, the disclosure of which is hereby incorporated by reference herein in its entirety for all purposes.

BACKGROUND OF THE INVENTION

The present invention relates in general to electrical energy control. In particular, the present invention relates to a wireless lighting controller for building lighting systems.

Lighting energy accounts for nearly 40% of commercial building electricity consumption. In many buildings, much of this energy use is a result of lighting that is on unnecessarily because of inadequate controls. Traditional wired switches are expensive to install, inflexible to changing requirements in the workplace, and unable to respond to available daylight or occupancy. For example, many buildings have adequate daylight along the perimeter, but the installed switching is not adequate to turn off the unnecessary lights.

There are wireless lighting controls on the market, but each suffer from certain shortcomings. Available residential systems tie a specific switch to a specific relay or relay channel and do not provide the flexibility needed for commercial building applications. Commercial systems require that specialized ballasts be installed to replace existing ballasts making them expensive and unlikely to gain significant market share. There is a need for a flexible and readily installable system that does not require replacing existing fluorescent ballasts or fixtures.

BRIEF SUMMARY OF THE INVENTION

The present invention provides for the wireless control of individual lighting fixtures via a wireless radio network. In order to achieve this, a radio-controlled relay is located between a lighting fixture or a ballast of a fluorescent fixture and its power supply and receives signals from remote controllers or via a computer interface. This wireless relay device is also configured to monitor the power consumption of a lighting fixture (or ballast) and send that information to the network. In the wireless control network, light level sensors and motion sensors also send information to the network to allow lights to respond to daylight levels or occupancy.

For a further understanding of the nature and advantages of the invention, reference should be made to the following description taken in conjunction with the accompanying drawings.

DETAILED DESCRIPTION OF THE INVENTION

The embodiments of the present invention are directed to a wireless controller and a wireless network using the controller for the control of lighting systems. The radio-controlled device includes several novel features. In addition, a control system that integrates several sensors in a radio network to control lights using the radio-controlled device also includes various novel features. Each of these is described below in further detail.

Radio-controlled Relay Device

Figure 1:
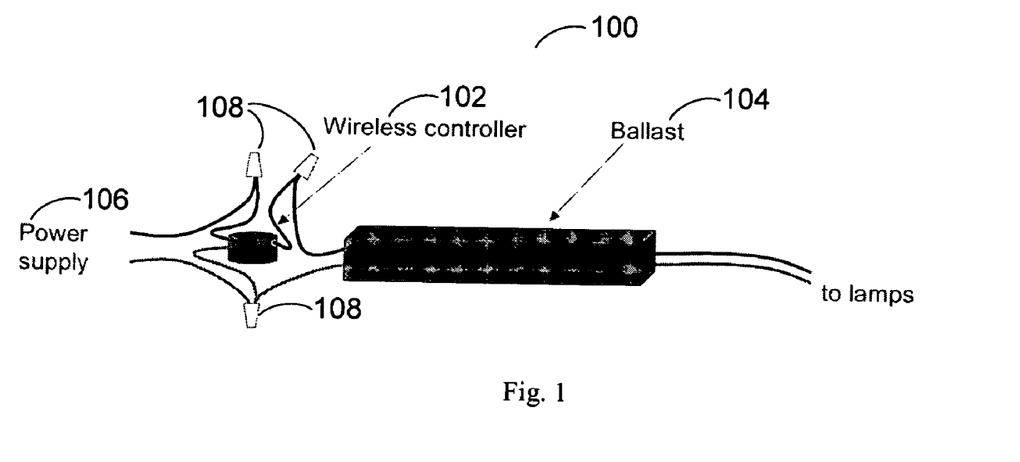
FIG. 1 is an exemplary schematic diagram of a wireless controller controlled relay installation in accordance with one embodiment of the present invention.

FIG. 1 is an exemplary schematic diagram 100 of a wireless controller controlled relay installation in accordance with one embodiment of the present invention. The radio-controlled relay device 102 can integrate a wireless radio, a relay (or one or more relays), a microprocessor, a dimming device, a power sensor and a signal generator in a stand-alone package that can easily be installed in a typical fluorescent fixture. It can be installed between ballast 104 and the ballast power source 106 and is powered by the lighting circuit. Installation is quite simple due to the design of the device. The housing of the device includes a small magnet (not shown) to enable the easy placement and positioning of the device against a lighting fixture, such as for example a fluorescent light fixture. In this manner, the device 102 is held in place with a thin magnet and the electrical connection is achieved using wire nuts 108. The packaging of the device 102 is compact and configured so that it can be installed in a few minutes to retrofit almost any fluorescent light fixture. The device 102 can be easily connected to an existing fixture with the wire nuts 108, and the device 102 can be easily integrated in a ballast using the device's compact housing using its small magnet.

Figure 2:
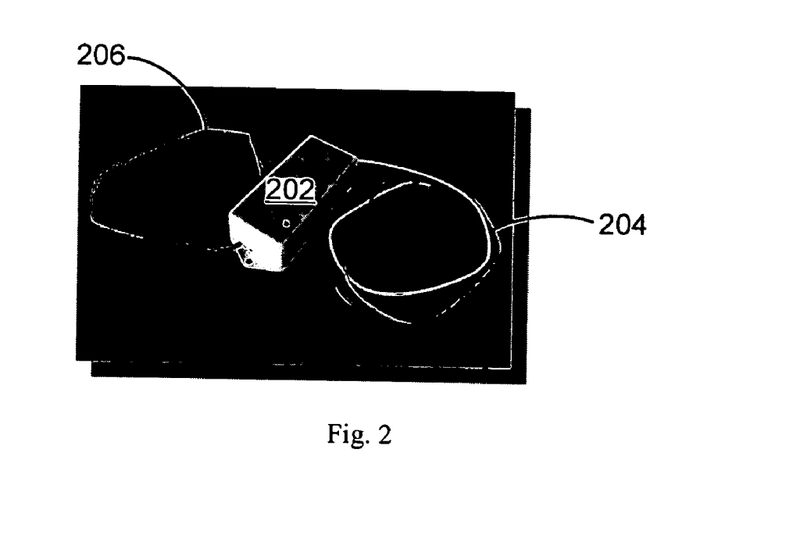
FIG. 2 shows the wireless controller of FIG. 1, its housing and wire connections.
Figure 3:
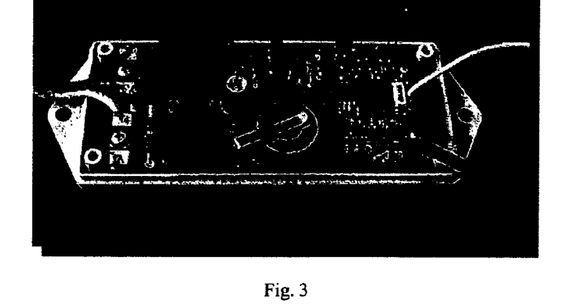
FIG. 3 shows the wireless controller of FIG. 2 with the top portion of the housing removed.

FIG. 2 shows the wireless controller of FIG. 1, its housing 202 and wire connections. Wire connections 204 are for the electrical connection of the device and wire connections 206 are for the light sensor (no shown). In this manner, once the device has been located and held in place against a light fixture, the light sensor can be optimally placed relative to the housing 202 via the flexible wire connection 206. FIG. 3 shows the wireless controller of FIG. 2 with the top portion of the housing removed, showing the printed circuit board and the internal components of the device.

Figure 4:
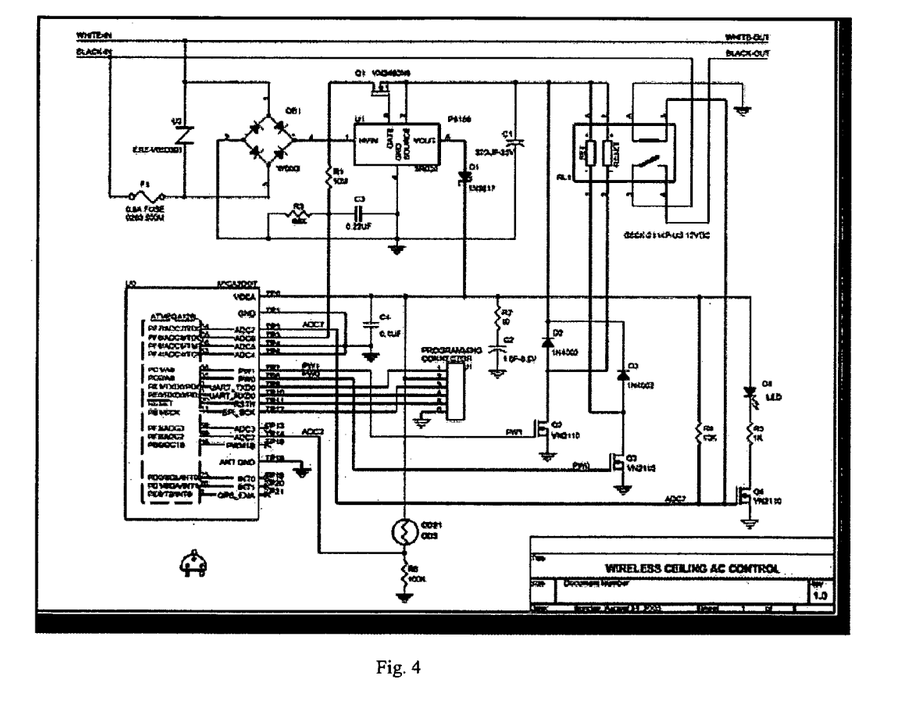
FIG. 4 is an exemplary wiring diagram for the wireless controller of FIG. 1.

FIG. 4 is an exemplary wiring diagram for the wireless controller of FIG. 1. The relay device is capable of receiving a radio signal that contains control information including turning on and off or dimming. This information can be specific to an individual relay or it can be for a group of relays. The device can also measure energy consumption of the light fixture or ballast and can transmit energy use and power quality information to a radio network. A light sensor in the device can detect whether the lamp is working properly and send information to the network about the status of the lamp. The device includes a power supply circuit that provides low-voltage operating power for the processor and the relay using the line voltage as a source. The line voltage can be either 120V or 277V, making the system compatible with most lighting systems. The design of this relay device makes it suitable for use in existing buildings, especially those with fluorescent fixtures without requiring new ballasts. The relay controller device can include the following features, which are summarized below.

Power supply: The controller is powered by using a small amount of current from the lighting circuit. It is compatible with any voltage between 24VAC and 277 VAC.

On/off control: One function of the device is to turn one or more ballasts on or off using one or more electromechanical relays.

Light sensor: The controller can have a low-cost light sensor that can measure approximate light levels. A purpose of this sensor is to determine if the lights that the controller is switching are on or off. It can be used to identify burned-out bulbs or malfunctioning relays or ballasts.

Power measurement: The device includes a power sensor that monitors energy use of the load controlled by controller. This allows the device to provide lighting energy usage at a detailed level. It can also be used to identify power outages or circuit failures.

0-10-volt control signal: Many existing dimmable ballasts use a 0-10-volt input signal to control light output. By having the capability to provide this signal into the controller, the system is compatible with existing dimming ballasts.

Short-term backup power supply: The controller device is powered by a small power supply circuit connected to the power provided for the ballast. In the event of a power failure or circuit failure, the device has the ability to continue operating for a minimum of one hour. The backup power supply circuit includes a capacitor that is charged by the power provided for the ballast. Alternatively, the backup power supply circuit can include a battery.

Integrated dimmer: By integrating a dimming circuit into the controller, it can be used to dim incandescent bulbs or dimmable fluorescent lights.

The wireless controller is configured to store location information and other data attributes related to its unique installation. Such information can include data such as an identifier, group information, and location of the device (e.g., building name, floor, fixture, group, etc.), which can be programmed into the device at or prior to its installation.

Integrated System

Figure 5:
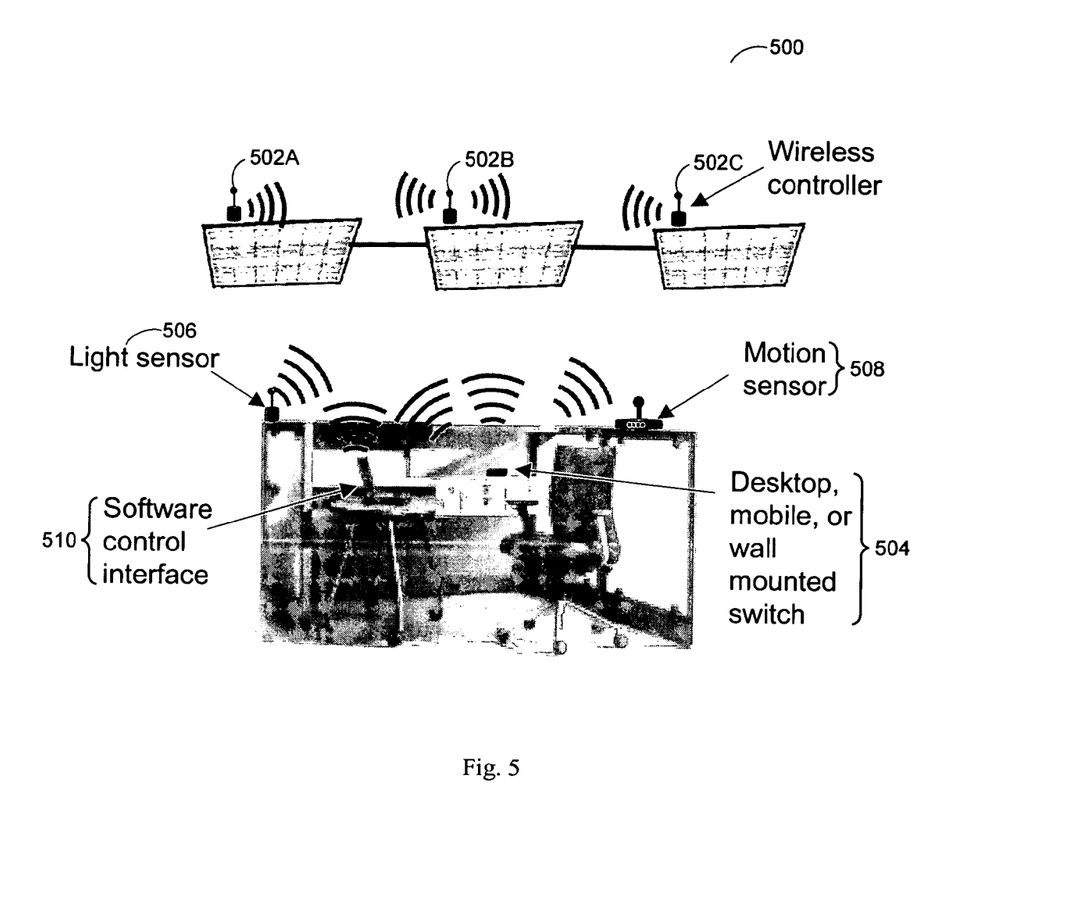
FIG. 5 is an exemplary diagram of a lighting control system using the wireless controller of FIG. 1.

FIG. 5 is an exemplary diagram of a lighting control system 500 using the wireless controller of FIG. 1. The system 500 is novel in the way it integrates sensors and controllers in a wireless network 500 to enable multiple control strategies for lighting systems. The system 500 includes one or more radio controlled relay devices 502A-C that can control one or more ballasts each, one or more hand-held or wall mounted controllers 504 that can generate control commands and send them over the network, one or more stand-alone light level sensors 506 that can measure room light levels and send that data to the network, one or more stand-alone motion sensors 508 that can be used to detect occupancy, and a software-based controller 510 that interfaces with a LAN to allow signals generated via software to be communicated over the radio network. The various components of the wireless network 500 are further described below.

In one embodiment, the occupancy sensor node 508 is a passive infrared sensor that can be used to detect motion as a proxy for occupancy. It transmits information about occupancy via a radio to the network whenever the occupancy state changes. That information can be used by any controller on the network. This device can be powered by either batteries or a small photovoltaic device.

Light level sensor node 506 measures the visible light level using a sensor connected to a radio and transmits the light level information to the network. This information can be used to turn lights on and off in response to daylight.

The LAN interface device 510 connects to a local area network and relays control information to the network and relays radio network information (e.g., energy use, light levels, relay state, failure information, etc.) to the local area network.

Figure 6:
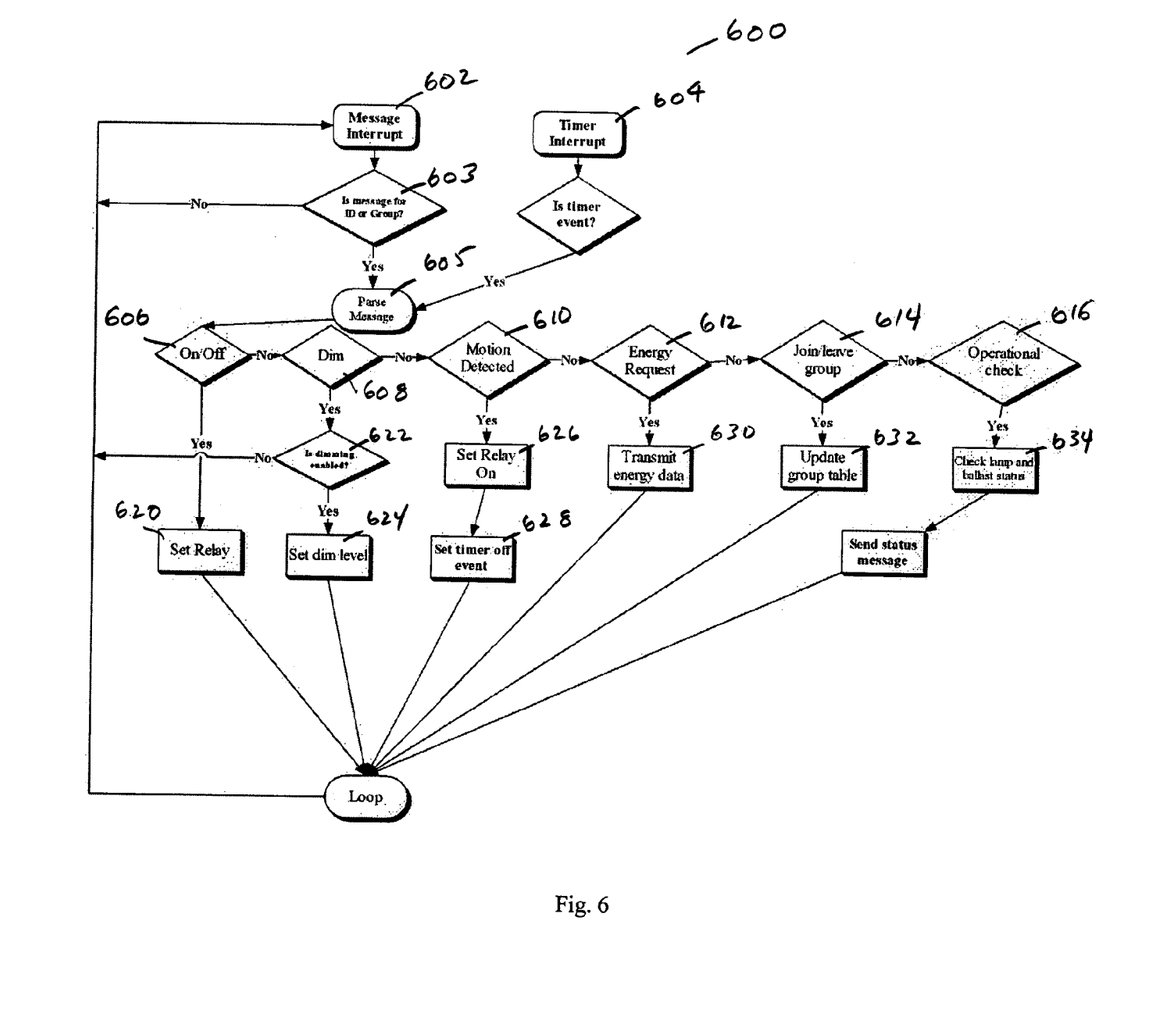
FIG. 6 is an exemplary controller software flowchart for the control system of FIG. 5.

FIG. 6 is an exemplary controller software flowchart 600 for the control system of FIG. 5. The computer program for the software-based controller 510 can be loaded from a computer-readable medium for execution by a host computer. As used herein, a variety of computer-readable media may be used for the recording media that stores the controller software, including: CD-ROM, flexible disks, magneto-optic discs, IC cards, ROM cartridges, punched cards, and internal storage devices (memories, such as RAM and ROM) and external storage devices. As can be seen the controller software operates in one of two main interrupt modes, namely a message interrupt 602 and a timer interrupt mode 604. For the message interrupt mode, once a message is received by the LAN interface device, at 603 it is determined whether the message is intended for an individual device or a group of devices that are controlled by the network. Once it has been decided that the message is intended for an individual device or a group of devices, the message is parsed at 605 to determine what message has been sent. Possible messages include: on/off; dim; motion detection; energy request; join/leave group and operational check.

If at 606, a determination is made that the message is an on or off message, the on or off message is sent out over the wireless network to a wireless controller where the relay is set (620). Once the relay has been set, the loop is closed and the software awaits another message or timer interrupt.

If at 606, it is determined that the message is not an on/off message, at 608, it is determined whether the message is a dimming message. If so, a check is made at 622, to determine whether a dimming option is enabled, and if yes, the dim level command is send to set the dim level at 624. If dimming is not enabled control returns to 602.

If at 608, it is determined that the message is not a dimming message, at 610, it is determined whether motion has been detected. If so, then at 626 the relay is set to on, and then at 628, a timer is set to turn the relay off after a certain time duration, and the control loop returns to 602.

If at 610 it is determined that motion was not detected, then at 612 it is determined whether an energy usage request has been made by the software controller. An energy request command is then sent to one or more of the wireless controllers. In response, a wireless controller sends its energy usage information back to the controller 510 at 630.

If at 612, it is determined that an energy request was not detected, then at 614, it is determined whether a request has been made to join (or otherwise leave) a wireless controller with a group. If so, at 632, appropriate group tables are updated. Such tables are stored in a database that is used by the software controller at the host computer.

If at 614 it is determined that a join/leave request was not detected, then at 616 it is determined whether an operational check message has been received. In response to an operational check message, the status of the lamp and/or ballast is checked at 634, and a message is sent by the relay controller to update the system's software-based controller with the status of a wireless relay controller. The wireless relay controller generates the requested information using its power sensor circuit, or its light sensor, or both.

So, in operation, once it has been determined what message has been received; appropriate follow-on action is taken. For example when a message has been received to turn a fixture off, an appropriate command is sent to the wireless relay controller to turn the fixture off, and so on, as shown on FIG. 6. In addition to the message interrupt mode, the network controller can also function in a timer interrupt mode, where control functions are initiated in response to timer events.

The wireless relay controller as a stand alone device and as a device incorporated in an integrated system, for example as shown in FIG. 5, provides several advantageous features. The power consumption circuit of the device enables the measuring of actual power consumption of lamps connected to the controller, and the device sends this information to the integrated system. This power consumption data, along with other events in the system, are stored in a database on the host computer connected via a LAN or the internet via a gateway element. This information has many potential uses including monitoring for energy conservation, demand response, and diagnostic purposes. In addition, the motion and light level sensors are not required to be associated with a particular light fixture, but rather can be a part of the integrated system and the light level and motion data can be used by any controller on the network.

Figure 7:
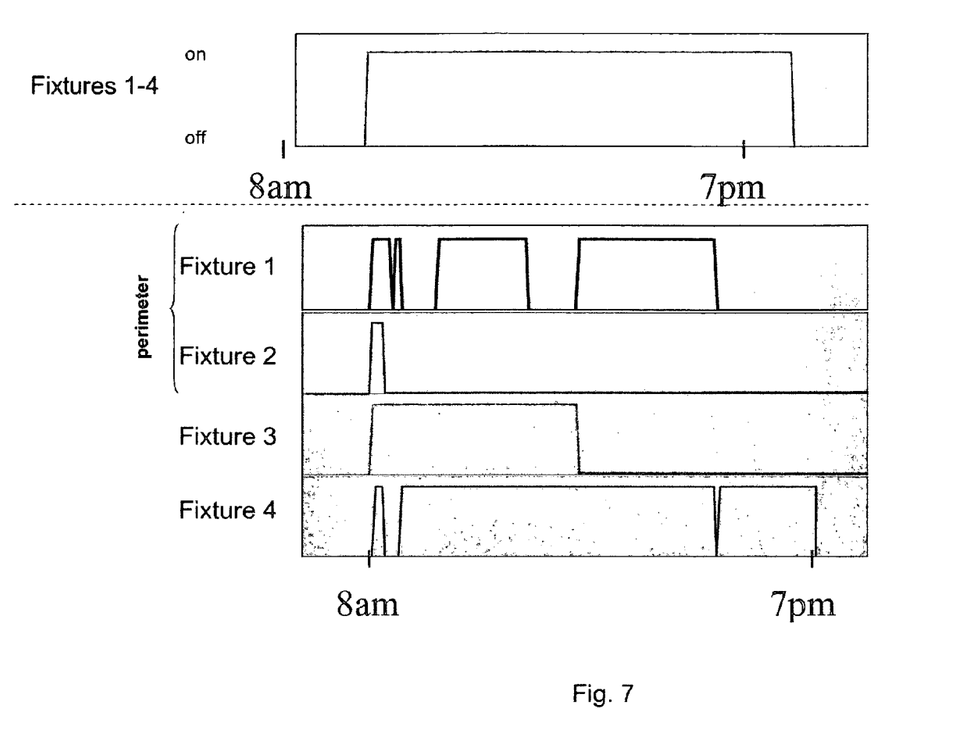
FIG. 7 shows an exemplary diagram of a typical lighting fixture use before and after retrofit with the wireless controller in accordance with the embodiments of the present invention.

FIG. 7 shows an exemplary diagram of a typical lighting fixture use before and after retrofit with the wireless controller in accordance with the embodiments of the present invention. As is shown in FIG. 7, four fixtures in a typical office room are normally on from about 8 am to 7 pm. In contrast, when the fixtures are incorporated into a network and controlled with the wireless relay device as described above, their on time is drastically reduced. For example, fixtures 3 and 4 are on when an occupant is near them and off otherwise. Fixture 2, being a perimeter fixture is on for short time and then off, since the light level sensor has send a message indicating that sufficient outdoor light is present. The overall fixture use reflects a 40 percent reduction in energy usage.

Accordingly, as will be understood by those of skill in the art, the present invention which is related to the wireless control of individual lighting fixtures via a wireless radio network after a simple retrofit at the fixture level, may be embodied in other specific forms without departing from the essential characteristics thereof. For example, any wireless protocol may be used to implement the control scheme in accordance with the embodiments of the present invention. Accordingly, the foregoing disclosure is intended to be illustrative, but not limiting, of the scope of the invention, which is set forth in the following claims.

What is claimed is:

1. A wireless relay controller configured for connection between a power source and a ballast, comprising:
    a power supply circuit configured to draw current from a lighting circuit of the power source;
    a control signal circuit configured to wirelessly receive control signals to control operation of a specified relay associated with the ballast;
    an on/off control circuit configured to control on or off power to the specified relay associated with the ballast in accordance with the wirelessly received control signal; and
    an energy monitoring power sensor configured to
        monitor energy use controlled by the control circuit, including energy use of the ballast or a plurality of lamps associated with the ballast, and
        wirelessly send the energy use information to a host computer, the energy use information comprising a measurement of power consumption of the ballast or associated lamps.

2. The wireless relay controller of claim 1 further comprising a light sensor configured to measure a light level.

3. The wireless relay controller of claim 1 wherein the power supply circuit is compatible with any voltage including and between 24 VAC and 277 VAC.

4. The wireless relay controller of claim 1 wherein the control signal circuit is configured to deliver a 0-10 volt control signal to control light output.

5. The wireless relay controller of claim 1 further comprising a short-term backup power supply circuit connected with the power source.

6. The wireless relay controller of claim 5 wherein the short-term backup power supply circuit is configured to provide power during a power failure or circuit failure, wherein the power provided by the short-term backup power supply circuit allows continued communication of information regarding the failure for at least one hour.

7. The wireless relay controller of claim 1 further comprising a dimmer circuit configured to send a dimming signal to the ballast, wherein the ballast is capable of dimming an associated lamp based on the dimming signal.

8. The wireless relay controller of claim 7 wherein the associated lamp includes dimmable compact fluorescent bulbs.

9. The wireless relay controller of claim 1 further comprising a housing and wherein the housing includes a magnetic portion for the attachment against a light fixture.

10. The wireless relay controller of claim 9 wherein the housing is dimensioned to fit in a ballast channel of the light source.

11. The wireless relay controller of claim 1, wherein the received control signal is sent from the host computer, the control signal concerning one of energy conservation, demand response, and diagnostics.

12. The wireless relay controller of claim 1, wherein monitoring energy use includes measuring an actual reduction in power consumption related to the control signal.

13. A wireless lighting control system, comprising:
    a wireless relay controller configured for connection between a power source and a ballast, the wireless relay controller comprising
        a power supply circuit configured to draw current from a lighting circuit of the power source;
        a control signal circuit configured to wirelessly receive control signals to control operation of a specified relay associated with the ballast;
        an on/off control circuit configured to control on or off power to the specified relay associated with the ballast in accordance with the wirelessly received control signal; and
        an energy monitoring power sensor configured to
            monitor energy use controlled by the control circuit, including energy use of the ballast or a plurality of lamps associated with the ballast, and
            wirelessly send the energy use information to a host computer, the energy use information comprising a measurement of power consumption of the ballast or associated lamps;
    one or more wireless nodes, each wireless node configured to generate a command for communication over a wireless network; and
    a software-controlled interface device configured to wirelessly receive a command from the one or more wireless nodes and wirelessly communicate the command to the wireless relay controller.

14. The wireless lighting control system of claim 13, wherein the wireless relay controller further comprises a light sensor configured to measure a light level.

15. The wireless lighting control system of claim 13, wherein the wireless relay controller further comprises a short-term backup power supply circuit connected with the power source.

16. The wireless lighting control system of claim 13, wherein the wireless relay controller further comprises a dimmer circuit.

17. The wireless lighting control system of claim 13, wherein the command includes instructions for operation of the wireless relay controller in one of a message interrupt mode and a timer interrupt mode.

18. The wireless lighting control system of claim 13, wherein the command includes instructions concerning on/off control by the wireless relay controller.

19. The wireless lighting control system of claim 18, wherein the command is generated by a wireless controller node.

20. The wireless lighting control system of claim 18, wherein the command is generated by a wireless occupancy sensor node.

21. The wireless lighting control system of claim 18, wherein the command is generated by a wireless light level sensor node.

22. The wireless lighting control system of claim 13, wherein the command includes instructions concerning an energy request signal to the wireless relay controller.

23. The wireless lighting control system of claim 13, wherein the command includes instructions concerning an operational check signal to the wireless relay controller.

24. The wireless lighting control system of claim 13, wherein the received control signal is sent from the host computer, the control signal concerning one of energy conservation, demand response, and diagnostics.

25. The wireless lighting control system of claim 13, wherein monitoring energy use includes measuring an actual reduction in power consumption related to the control signal.

26. A method for wireless relay control, the method comprising:
   wirelessly receiving control signals concerning operation of a specified relay associated with a ballast;
   controlling power provided from a power source to the specified relay associated with the ballast in accordance with the wirelessly received control signal, the control being exerted by a control circuit;
   monitoring energy use under control of the, including energy use of the ballast or a plurality of lamps associated with the ballast; and
   wirelessly sending the energy use information to a host computer, the energy use information comprising a measurement of power consumption of the ballast or associated lamps.

27. The method of claim 26, wherein the received control signal is sent from the host computer, the control signal concerning one of energy conservation, demand response, and diagnostics.

28. The method of claim 27, wherein monitoring energy use includes measuring an actual reduction in power consumption related to the control signal.

* * * * *

UNITED STATES PATENT AND TRADEMARK OFFICE
CERTIFICATE OF CORRECTION

PATENT NO. : 7,623,042 B2　　　　　　　　　　　　　　　　　　　　　　　　　　　　Page 1 of 1
APPLICATION NO. : 11/376620
DATED : November 24, 2009
INVENTOR(S) : Charles A. Huizenga It is certified that error appears in the above-identified patent and that said Letters Patent is hereby corrected as shown below:

In column 8, line 16, the words --control circuit-- should be inserted following "of the" and before the "," and claim 26 should be corrected to read as follows:

monitoring energy use under control of the control circuit, including . . .

Signed and Sealed this

Twelfth Day of January, 2010

David J. Kappos
*Director of the United States Patent and Trademark Office*